(12) United States Patent
Kang et al.

(10) Patent No.: US 12,068,483 B2
(45) Date of Patent: Aug. 20, 2024

(54) ELECTRODE BINDER COMPOSITION FOR RECHARGEABLE BATTERY AND ELECTRODE MIXTURE INCLUDING THE SAME

(71) Applicant: LG Chem, Ltd., Seoul (KR)

(72) Inventors: Min Ah Kang, Daejeon (KR); Dong Jo Ryu, Daejeon (KR); Seon Hee Han, Daejeon (KR); Jung Sup Han, Daejeon (KR); Jeong Man Son, Daejeon (KR); Cheolhoon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 716 days.

(21) Appl. No.: 17/267,202

(22) PCT Filed: Oct. 21, 2019

(86) PCT No.: PCT/KR2019/013829
§ 371 (c)(1),
(2) Date: Feb. 9, 2021

(87) PCT Pub. No.: WO2020/085739
PCT Pub. Date: Apr. 30, 2020

(65) Prior Publication Data
US 2021/0313582 A1 Oct. 7, 2021

(30) Foreign Application Priority Data

Oct. 23, 2018 (KR) .................. 10-2018-0126930

(51) Int. Cl.
| | |
|---|---|
| H01M 4/62 | (2006.01) |
| C08F 2/26 | (2006.01) |
| C08F 236/06 | (2006.01) |
| C08F 236/10 | (2006.01) |
| C08F 236/12 | (2006.01) |
| H01M 4/36 | (2006.01) |
| H01M 10/0525 | (2010.01) |
| H01M 10/44 | (2006.01) |

(52) U.S. Cl.
CPC .............. H01M 4/622 (2013.01); C08F 2/26 (2013.01); C08F 236/06 (2013.01); C08F 236/10 (2013.01); C08F 236/12 (2013.01); H01M 4/366 (2013.01); H01M 10/0525 (2013.01); H01M 10/44 (2013.01)

(58) Field of Classification Search
CPC .. H01M 4/622; H01M 4/366; H01M 10/0525; H01M 10/44; C08F 2/26; C08F 236/06; C08F 236/10; C08F 236/12
See application file for complete search history.

(56) References Cited

U.S. PATENT DOCUMENTS

| | | | |
|---|---|---|---|
| 2008/0090154 A1* | 4/2008 | Ihara ................. | H01M 10/0568 |
| | | | 429/188 |
| 2011/0081601 A1 | 4/2011 | Weber et al. | |
| 2012/0189911 A1* | 7/2012 | Kang .................... | H01M 4/622 |
| | | | 429/211 |
| 2013/0209876 A1 | 8/2013 | Kang et al. | |
| 2014/0142238 A1 | 5/2014 | Guo | |
| 2015/0203619 A1 | 7/2015 | Nagelsdiek et al. | |
| 2015/0357647 A1 | 12/2015 | Kurata et al. | |
| 2016/0079007 A1* | 3/2016 | Otsuka ................. | H01M 50/42 |
| | | | 526/318.4 |
| 2016/0156038 A1* | 6/2016 | Park ..................... | H01M 4/622 |
| | | | 429/217 |
| 2017/0198186 A1* | 7/2017 | Bulinski .............. | C07D 413/12 |

(Continued)

FOREIGN PATENT DOCUMENTS

| | | |
|---|---|---|
| CN | 102971895 A | 3/2013 |
| CN | 104919634 A | 9/2015 |
| CN | 104981927 A | 10/2015 |

(Continued)

OTHER PUBLICATIONS

Decision to grant a Patent published by SIPO for Application No. 201980052863 (Year: 2023).*

(Continued)

*Primary Examiner* — Alexander Usyatinsky
(74) *Attorney, Agent, or Firm* — Lerner David LLP

(57) ABSTRACT

An electrode binder composition for a rechargeable battery includes emulsion polymer particles comprising a1) first repeat units derived from conjugated diene monomers; one or more second repeat units selected from the group consisting of b1) repeat units derived from aromatic vinyl monomers, b2) repeat units derived from alkyl (meth)acrylate monomers, b3) repeat units derived from (meth)acryl amide monomers, b4) repeat units derived from nitrile based monomers, and b5) repeat units derived from unsaturated carbonic acid monomers; and c1) third repeat units derived from monomers represented by the following Chemical Formula 1:

[Chemical Formula 1]

wherein R1 is hydrogen, or a C1-10 alkyl group, X is hydrogen or a methyl group, Y is oxygen atom, or —NR2—, R2 is hydrogen, or a C1-10 alkyl group, and Z is a C1-10 alkyl group.

14 Claims, No Drawings

(56) References Cited

U.S. PATENT DOCUMENTS

2018/0351177 A1* 12/2018 Kang ................ C08L 15/00

FOREIGN PATENT DOCUMENTS

| | | |
|---|---|---|
| JP | 2010245035 A | 10/2010 |
| JP | 4596120 B2 | 12/2010 |
| JP | 2011517704 A | 6/2011 |
| JP | 2011204573 A | 10/2011 |
| JP | 2014520187 A | 8/2014 |
| KR | 20070023141 A | 2/2007 |
| KR | 100845702 B1 | 7/2008 |
| KR | 20100119888 A | 11/2010 |
| KR | 20120005961 A | 1/2012 |
| KR | 20140138057 A | 12/2014 |
| KR | 20150093803 A | 8/2015 |
| KR | 20150100684 A | 9/2015 |
| WO | 2005064716 A1 | 7/2005 |
| WO | 2014112618 A1 | 7/2014 |
| WO | WO 2017111514 * | 6/2017 |

OTHER PUBLICATIONS

Decision to grant a Patent published by KPO for Application No. 20180126930 (Year: 2022).*
International Search Report for Application No. PCT/KR2019/013829, mailed Feb. 7, 2020, pp. 1-2.
European Search Report for Application No. EP19874899. dated May 26, 2021, 7 pages.

* cited by examiner

ELECTRODE BINDER COMPOSITION FOR RECHARGEABLE BATTERY AND ELECTRODE MIXTURE INCLUDING THE SAME

CROSS-REFERENCE TO RELATED APPLICATIONS

This application is a national phase entry under 35 U.S.C. § 371 of International Application No. PCT/KR2019/013829, filed on Oct. 21, 2019, which claims priority to Korean Patent Application No. 10-2018-0126930, filed on Oct. 23, 2018 with the Korean Intellectual Property Office, the disclosures of which are herein incorporated by reference in their entirety.

BACKGROUND OF THE INVENTION

(A) Field of the Invention

The invention relates to an electrode binder composition for a rechargeable battery and an electrode mixture including the same.

(b) Description of the Related Art

Due to rapid increase in the use of fossil fuel, there is an increasing demand for the use of alternative energy or clean energy, and as part of that, the field of rechargeable batteries using electrochemistry is being most actively studied.

Recently, with the increase in technical development and demand for portable devices such as a portable computer, a portable telephone, a camera, and the like, a demand for rechargeable batteries is rapidly increasing as the energy source, and among the rechargeable batteries, lithium rechargeable batteries having high energy density and operating potential, long cycle life and low self-discharge rate have been studied a lot and commercialized and are being widely used.

And, with the increase in the interest in environmental problems, a lot of studies on electric vehicles or hybrid vehicles capable of replacing fossil fuel engine, one of the main causes of air pollution, are being progressed, and lithium rechargeable batteries are also used as a power source of such electric vehicles, hybrid vehicles, and the like.

In general, in lithium rechargeable batteries, lithium transition metal oxide is used as cathode active material, and graphite material is used as anode active material. The electrode of a lithium rechargeable battery is prepared by mixing such active materials with binder components, dispersing it in a solvent to form slurry, and then, coating it on the surface of a current collector to form a mixture layer.

In general, charge and discharge of a lithium rechargeable battery is progressed while repeating intercalation/deintercalation of lithium ions of the cathode into/from the anode, and during the repeated process, binding between electrode active materials or conductive materials becomes loose, and contact resistance between particles increases, and thus, resistance of the electrode itself may also increase.

Thus, binder used in an electrode should not only maintain excellent binding strength between electrode active material and a current collector, but also be able to compensate for expansion/contraction of electrode active material according to intercalation/deintercalation of lithium ions in the electrode.

Particularly, recently, in order to increase discharge capacity of an electrode, material having high discharge capacity such as silicon, tin, silicon-tin alloy, and the like is frequently mixed with natural graphite having theoretical discharge capacity of 372 mAh/g, and thus, with repeated charge and discharge, volume expansion rate of material remarkably increases, and anode material is detached, and thus, battery capacity rapidly decreases, and cycle life becomes short.

And, a lithium ions battery may be swollen by gas generated during the decomposition of electrolyte inside of the battery, and if the temperature of a battery increases with the use of electronic products, the decomposition of electrolyte may be promoted, swelling may be accelerated, and the stability of a battery may be deteriorated.

Thus, there is an urgent demand for studies on binder and electrode material that can not only realize excellent binding strength, but also maintain structural stability of an electrode even after repeated charge/discharge cycles, so as to prevent separation between electrode active materials or between electrode active materials and a current collector.

SUMMARY OF THE INVENTION

Technical Problem

It is an object of the invention to provide an electrode binder composition for a rechargeable battery that not only has excellent properties in terms of binding strength, mechanical properties, and the like, but also can maintain structural stability of an electrode even after repeated charge/discharge cycles.

It is another object of the invention to provide a rechargeable battery electrode mixture comprising the electrode binder composition for a rechargeable battery.

It is another object of the invention to provide a rechargeable battery electrode comprising the rechargeable battery electrode mixture.

It is another object of the invention to provide a rechargeable battery comprising the rechargeable battery electrode.

Technical Solution

According to one aspect of the invention, there is provided an electrode binder composition for a rechargeable battery comprising
emulsion polymer particles comprising
a1) first repeat units derived from conjugated diene monomers;
one or more second repeat units selected from the group consisting of b1) repeat units derived from aromatic vinyl monomers, b2) repeat units derived from alkyl (meth)acrylate monomers, b3) repeat units derived from (meth)acryl amide monomers, b4) repeat units derived from nitrile based monomers, and b5) repeat units derived from unsaturated carbonic acid monomers; and
c1) third repeat units derived from monomers represented by the following Chemical Formula 1:

[Chemical Formula 1]

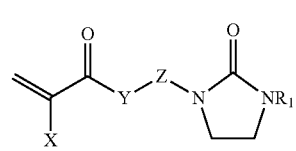

in the Chemical Formula 1,
R1 is hydrogen, or a C1-10 alkyl group,
X is hydrogen or a methyl group,
Y is oxygen atom, or —NR2-, R2 is hydrogen, or a C1-10 alkyl group, and
Z is a C1-10 alkyl group.

In the compound represented by the Chemical Formula 1, it may be preferable that X is a methyl group, Y is oxygen atom, or —NH—, and Z is a C1-3 alkyl group.

Wherein, the emulsion polymer particles may comprise the second repeat units at a ratio of about 0.1 to about 5, preferably at a ratio of about 0.2 to about 2.5, based on the repeat number of the first repeat units.

And, the emulsion polymer particles may comprise the third repeat units at a ratio of about 0.0006 to about 0.03, preferably about 0.001 to about 0.02, based on the repeat number of the first repeat units.

And, the emulsion polymer particles may comprise the third repeat units at a ratio of about 0.0001 to about 0.03, preferably about 0.0003 to about 0.01, based on the total repeat number of the first to third repeat units.

According to one embodiment of the invention, the emulsion polymer particles may further comprise one or more emulsifiers selected from the group consisting of anionic emulsifiers, cationic emulsifiers, and non-ionic emulsifiers.

Wherein, the anionic emulsifier may include one or more selected from the group consisting of sodium dodecyl diphenyl ether disulfonate, sodium polyoxyethylene alkyl ether sulfate, sodium lauryl sulfate, sodium dodecyl benzene sulfonate, and dioctyl sodium sulfosuccinate.

And, the non-ionic emulsifier may include one or more selected from the group consisting of polyethylene oxide alkyl aryl ether, polyethylene oxide alkyl amine, and polyethylene oxide alkyl ester.

In case the emulsion polymer particles comprise the emulsifier, the emulsion polymer particles may comprise emulsifiers in an amount of about 0.01 to about 10 parts by weight, based on 100 parts by weight of the monomer components.

And, the electrode binder composition for a rechargeable battery may further comprise an aqueous solvent.

Wherein, the aqueous solvent may be included in an amount of about 50 to about 1,000 parts by weight, based on 100 parts by weight of the latex particles.

Meanwhile, according to another aspect of the invention, there is provided a rechargeable battery electrode mixture comprising the above explained electrode binder composition for a rechargeable battery and electrode active material.

Wherein, the rechargeable battery electrode mixture may further comprise a conductive agent.

Meanwhile, according to yet another aspect of the invention, there is provided an rechargeable battery electrode comprising an electrode mixture layer comprising the above rechargeable battery electrode mixture; and an electrode current collector.

And, according to yet another aspect of the invention, there is provided a rechargeable battery comprising the rechargeable battery electrode.

As used herein, terms "a first", "a second" and the like are used to explain various constructional elements, and they are used only to distinguish one constructional element from other constructional elements.

And, the terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

And, in case it is stated that each layer or element is formed "on" or "above" each layer or element, it means that each layer or element is formed directly on each layer or element, or that other layers or elements may be additionally formed between the layers, or on the object or substrate.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, the invention will be explained in detail.

According to one aspect of the invention, there is provided an electrode binder composition for a rechargeable battery comprising emulsion polymer particles comprising
  a1) first repeat units derived from conjugated diene monomers;
  one or more second repeat units selected from the group consisting of b1) repeat units derived from aromatic vinyl monomers, b2) repeat units derived from alkyl (meth)acrylate monomers, b3) repeat units derived from (meth)acryl amide monomers, b4) repeat units derived from nitrile based monomers, and b5) repeat units derived from unsaturated carbonic acid monomers; and
  c1) third repeat units derived from monomers represented by the following Chemical Formula 1:

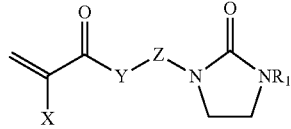

[Chemical Formula 1]

in the Chemical Formula 1,
R1 is hydrogen, or a C1-10 alkyl group,
X is hydrogen or a methyl group,
Y is oxygen atom, or —NR2-, R2 is hydrogen, or a C1-10 alkyl group, and
Z is a C1-10 alkyl group.

The invention is based on the discovery that in case in the existing electrode binder composition for a rechargeable battery comprising the emulsion of latex particles prepared by emulsion polymerization of conjugated diene monomers and/or acrylate monomers, and the like, monomers with a specific chemical structure are used together to prepare latex particles, adhesive strength, particularly wet adhesive strength may be significantly improved, thus realizing stable binding between electrode active materials or between electrode active material and a current collector.

First, the electrode binder composition for a rechargeable battery according to one embodiment of the invention comprises emulsion polymer particles of specific monomers, namely latex particles, and each monomers may exist in the form of repeat units derived from the monomers in the latex particles.

Monomers

First, for the emulsion polymerization for preparing latex particles, conjugated diene monomers may be used, and thus, the latex particles comprise repeat units derived from conjugated diene monomers, namely first repeat units.

As representative examples of the conjugated diene monomers, one or more selected from the group consisting of 1,3-butadiene, isoprene, chloroprene, and piperylene may be mentioned, and preferably, it may be 1,3-butadiene.

And, for the emulsion polymerization for preparing latex particles, besides the conjugated diene monomers, one or more monomers selected from the group consisting of b1) aromatic vinyl monomers, b2) alkyl (meth)acrylate monomers, b3) (meth)acryl amide monomers, b4) nitrile based monomers, and b5) unsaturated carbonic acid monomers may be additionally used, and thus, the latex particles comprise repeat units derived from the above explained monomers, namely second repeat units.

The aromatic vinyl monomers may be one or more selected from the group consisting of styrene, α-methylstyrene, β-methylstyrene, p-t-butylstyrene, chlorostyrene, vinylbenzoic acid, vinylbenzoic acid methyl, vinyl naphthalene, chloromethylstyrene, hydroxymethylstyrene and divinylbenzene, preferably, styrene.

In case such conjugated diene monomers are included as the components of latex particles, a binder prepared therefrom may inhibit electrolyte swelling at high temperature, may have elasticity due to the rubber component, and thus, perform functions for reducing the thickness of an electrode, decreasing gas generation, and improving adhesive strength so as to maintain binding strength between electrode active material and a current collector.

And, the alkyl (meth)acrylate monomers may be one or more selected from the group consisting of methyl acrylate, ethyl acrylate, propyl acrylate, isopropyl acrylate, n-butyl acrylate, isobutyl acrylate, n-amyl acrylate, isoamyl acrylate, 2-ethylhexyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, lauryl acrylate, ceryl acrylate, stearyl acrylate, lauryl methacrylate, cetyl methacrylate and stearyl methacrylate.

And, the (meth)acryl amide monomers may be one or more selected from the group consisting of acrylamide, n-methylol acrylamide, n-butoxymethyl acrylamide, methacrylamide, n-methylol methacrylamide, n-butoxymethyl methacrylamide.

And, the nitrile based monomers are monomers including ethylenically unsaturated groups and nitrile groups in the molecule, and for example, acrylonitrile, methacrylonitrile, allyl cyanide, and the like may be mentioned.

And, the unsaturated carbonic acid monomers may be one or more selected from the group consisting of acrylic acid, methacrylic acid, maleic acid, fumaric acid, glutaric acid, itaconic acid, tetrahydrophthalic acid, crotonic acid, isocrotonic acid, and nadic acid.

And, for the emulsion polymerization for preparing latex particles, c1) monomers represented by the following Chemical Formula 1 is further used, and thus, the latex particles comprise repeat units derived from the above explained monomers, namely third repeat units.

[Chemical Formula 1]

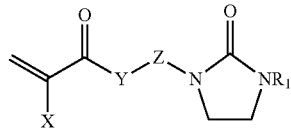

in the Chemical Formula 1,
R1 is hydrogen, or a C1-10 alkyl group,
X is hydrogen or a methyl group,
Y is oxygen atom, or —NR2-, R2 is hydrogen, or a C1-10 alkyl group, and
Z is a C1-10 alkyl group.

The monomer represented by the Chemical Formula 1 may have high polarity and exhibit various forms of hydrogen bonds, due to the structure comprising ester groups (—COO—) and/or plural amide bonds in the molecule, particularly the structure comprising cyclic urea group, Thus, in case the monomers represented by the Chemical Formula 1 are used as a binder, binding strength with a current collector may be improved, and excellent adhesive strength may be maintained even in wet condition.

And, in the monomers represented by the Chemical Formula 1, in case X is methyl, Y is oxygen atom or —NH—, and Z is a C1-3 alkyl group, polarity and length of the molecule may be appropriately controlled, thus easily forming crosslink with monomers, and further maximizing the above explained effects.

And, copolymer latex particles prepared by emulsion polymerization of the above monomers in combination have low electrolyte swelling degree and high binding strength with a current collector, and thus, may improve the life cycle characteristics of an electrode, and a binder composition comprising such latex particles may improve the performances of a lithium rechargeable battery.

Wherein, the emulsion polymer particles may comprise the second repeat units at a ratio of about 0.1 to about 5, preferably at a ratio of about 0.2 to about 2.5, based on the repeat number of the first repeat units.

The repeat number ratio of the repeat units refers to a relative ratio of the repeat number of repeat units introduced from each monomers in the latex particles, namely the mole ratio of the repeat units.

In case the content of the second repeat units is too small compared to the first repeat units, glass transition temperature of binder may decrease, and adhesive strength may be lowered, and if the content of the second repeat units is too large compared to the first repeat units, glass transition temperature of binder may increase, and rigidity may increase, and thus, flexibility and adhesion force may be lowered.

And, the emulsion polymer particles may comprise the third repeat units at a ratio of about 0.0006 to about 0.03, preferably at a ratio of about 0.001 to about 0.02, based on the repeat number of the first repeat units.

If the content of the third repeat units is too small compared to the first repeat units, it may be difficult to obtain advantage resulting from the use of the monomers of the Chemical Formula 1, and particularly, excellent adhesive strength may not be exhibited under wet condition, and if the content of the third repeat units is too large compared to the first repeat units, binding strength between the internal molecules of binder may increase, and thus, adhesive strength with a current collector may be lowered to the contrary.

Similarly, the emulsion polymer particles may comprise the third repeat units at a ratio of about 0.0001 to about 0.03, preferably at a ratio of about 0.0003 to about 0.01, based on the total repeat number of the first to third repeat units.

If the content of the third repeat units is too small compared to the total repeat number of the first to third repeat units, namely total monomer components used for preparation of latex, wet adhesive strength may be lowered, and thus, the performances of a battery may be deteriorated. And, if the content of the third repeat units is too large compared to the total repeat number of the first to third repeat units, crosslink connecting each repeat unit may be formed in the binder, and thus, binding strength between the binder molecules may increase, and adhesive strength with a current collector may decrease, and thus, the performances of a battery may be deteriorated.

Emulsion Polymerization

The emulsion polymer particles, namely latex particles included in the binder composition according to one embodiment of the invention may be prepared by a commonly known emulsion polymerization method.

Wherein, polymerization temperature and polymerization time may be appropriately determined according to circumstances. For example, the polymerization temperature may be about 50° C. to about 200° C., and polymerization time may be about 0.5 hours to about 20 hours.

As polymerization initiators that can be used for the emulsion polymerization, inorganic or organic peroxide may be mentioned, and for example, water soluble initiators including potassium persulfate, sodium persulfate, ammonium persulfate, and the like, and oil soluble initiators including cumene hydroperoxide, benzoyl peroxide, and the like may be used.

And, an activator for promoting the initiation of the reaction of peroxide may be further included together with the polymerization initiator, and as the activators, one or more selected from the group consisting of sodium formaldehyde sulfoxylate, sodium ethylenediamine tetraacetate, ferrous sulfate and dextrose may be used.

Emulsifier

And, the emulsion polymer particles may further comprise one or more emulsifiers selected from the group consisting of anionic emulsifiers, cationic emulsifiers, and non-ionic emulsifiers.

The emulsifier is material simultaneously having a hydrophilic group and a hydrophobic group, and during the emulsion polymerization process, it forms a micelle structure and enables polymerization of monomers in the micelle structure.

The emulsifiers commonly used for emulsion polymerization may be classified into anionic emulsifiers, cationic emulsifiers and non-ionic emulsifiers, and for polymerization stability in the emulsion polymerization, two or more kinds may be used in combination.

Specifically, as the anionic emulsifiers, sodium dodecy diphenyl ether disulfonate, sodium polyethylene alkyl ether sulfate, sodium lauryl sulfate, sodium dodecyl benzene sulfonate, dioctyl sodium sulfosuccinate, and the like may be mentioned.

And, the non-ionic emulsifiers may be polyethylene oxide alkyl aryl ether, polyethylene oxide alkyl amine, polyethylene oxide alkyl ester, and the like, they may be used alone or in combinations of two or more kinds, and using anionic emulsifier and non-ionic emulsifier in combination may be more effective, but the kind of emulsifiers is not limited thereto.

The emulsifier may be used in the amount of about 0.01 to about 10 parts by weight, about 1 to about 10 parts by weight, or about 3 to about 5 parts by weight, based on 100 parts by weight of the total monomer components used for the preparation of latex particles.

If the emulsifier is used in an excessive amount, the particle diameter of latex particles may decrease, and thus, the adhesive strength of binder may be lowered, and if it is used too small, polymerization stability in the emulsion polymerization reaction may be lowered, and the stability of produced latex particles may be also lowered.

Solvent

According to one embodiment of the invention, the electrode binder composition for a rechargeable battery may further comprise an aqueous solvent, besides the above explained emulsion polymer particles, namely latex particles.

Wherein, the aqueous solvent may be used in an amount of about 50 to about 1,000 parts by weight, preferably about 100 to about 300 parts by weight, based on 100 parts by weight of the latex particles, so as to control the stability and viscosity of latex particles, and for example, based on the total amount of the binder composition, it may be used such that total solid content (TSC) may become about 9 to about 67 wt %.

If the solvent is used too small, the stability of latex particles may be lowered, and if it is used excessively, viscosity may be lowered, and the adhesive strength of the binder may decrease, and thus, the performances of a battery may be deteriorated.

Electrode Mixture and Electrode

Meanwhile, according to another aspect of the invention, there is provided a rechargeable battery electrode mixture comprising the above explained electrode binder composition for a rechargeable battery and electrode active material.

And, according to another aspect of the invention, there is provided a rechargeable battery electrode comprising an electrode mixture layer comprising the rechargeable battery electrode mixture; and an electrode current collector.

Except the above explained binder, electrode active material, electrode current collector, and the like used in the electrode mixture and electrode of the invention may respectively comprise commonly known constructional elements.

For example, the electrode mixture may be used for the preparation of an anode. Namely, the electrode mixture may be an anode mixture, and the electrode active material may be anode active material.

Wherein, the binder may be included in the content of 1 wt % to 10 wt %, specifically 1 wt % to 5 wt %, based on the total weight (100 wt %) of the anode mixture. Within this range, the content of the anode active material may be relatively increased, and discharge capacity of the electrode may be further improved.

Meanwhile, since the binder has excellent binding strength, mechanical properties, and the like, not only in case graphite anode active material is used as the anode active material of the anode mixture, but also in case anode active material with higher capacity is used, binding strength between anode active material and cathode active material, between anode active material and anode current collector, and the like, may be maintained, and the expansion of anode active material may be inhibited by its mechanical properties.

As explained, since the binder is suitable for apply together with graphite anode active material and anode active material with higher capacity, in one embodiment of the invention, the kind of the anode active material is not specifically limited.

Specifically, as the anode active material, carbonaceous and graphite material such as natural graphite, artificial graphite, carbon fiber, non-graphitizable carbon, and the like; metals that can be alloyed with lithium such as Al, Si, Sn, Ag, Bi, Mg, Zn, In, Ge, Pb, Pd, Pt, Ti, and the like, and compounds including such elements; composites of metal or compounds thereof with carbonaceous and graphite material; lithium-containing nitride; titanium oxide; lithium titanium oxide, and the like may be mentioned, but the anode active material is not limited thereto. Among them, carbonaceous active material, silicon-based active material, tin-based active material, or silicon-carbon active material is more preferable, and these may be used alone or in combinations.

The anode current collector is generally formed with a thickness of 3 to 500 µm. The anode current collector is not specifically limited as long as it is conductive without inducing chemical changes in the corresponding battery, and for example, copper, stainless steel, aluminum, nickel, titanium, baked carbon, copper or stainless steel surface treated with carbon, nickel, titanium, silver, and the like, aluminum-cadmium alloy, and the like may be used. And, similarly to a cathode current collector, fine unevenness may be formed on the surface to reinforce the binding strength of the anode active material, and it may be used in various forms such as a film, a sheet, a foil, a net, a porous body, a foaming body, non-woven fabrics, and the like.

The anode may be prepared by coating an electrode mixture comprising anode active material and the binder on an anode current collector, and then, drying and rolling, and if necessary, a conductive agent, filler, and the like may be further added.

The conductive agent is not specifically limited as long as it has conductivity without inducing chemical change in the corresponding battery, and for example, conductive materials such as graphite such as natural graphite or artificial graphite, and the like; carbon black such as carbon black, acetylene black, ketjen black, channel black, furnace black, lamp black, summer black, and the like; conductive fiber such as carbon fiber or metal fiber, and the like; metal powder such as fluorinated carbon, aluminum nickel powder, and the like; conductive whisker such as zinc oxide, potassium titanate, and the like; conductive oxide such as titanium oxide, and the like; polyphenylene derivatives, and the like may be used.

The filler is optionally used as a component for inhibiting the expansion of an anode, is not specifically limited as long as it is fibrous material without inducing chemical changes in corresponding battery, and for example, olefin polymer such as polyethylene, polypropylene; fibrous material such as glass fiber, carbon fiber, and the like may be used.

Meanwhile, the electrode mixture is not limited to an anode mixture, and it may be used for the preparation of a cathode. Namely, the electrode mixture may be a cathode mixture, and the electrode active material may be cathode active material.

As the cathode active material, layered compounds such as lithium cobalt oxide($LiCoO_2$), lithium nickel oxide ($LiNiO_2$), unsubstituted or substituted with one or more transition metals; lithium manganese oxide such as $Li_{1+x}Mn_{2-x}O_4$ (wherein, x is 0 to 0.33), $LiMnO_3$, $LiMn_2O_3$, $LiMnO_2$, and the like; lithium copper oxide ($Li_2CuO_2$); vanadium oxide such as $LiV_3O_8$, $LiFe_3O_4$, $V_2O_5$, $Cu_2V_2O_7$, and the like; lithium iron phosphate represented by $Li_{1+a}Fe_{1-x}M_xPO_{4-b}A_b$ (wherein, M is one or more selected from the group consisting of Mn, Ni, Co, Cu, Sc, Ti, Cr, V and Zn, A is one or more selected from the group consisting of S, Se, F, Cl and I, $-0.5<a<0.5$, $0=x<0.5$, $0≤=b≤=0.1$); Ni-site lithium nickel oxide represented $LiNi_{1-x}M_xO_2$ (wherein, M=Co, Mn, Al, Cu, Fe, Mg, B or Ga, x=0.01 to 0.3); $LiMn_{2-x}M_xO_2$ (wherein, M=Co, Ni, Fe, Cr, Zn or Ta, x=0.01 to 0.1), lithium manganese complex oxide represented by $Li_2Mn_3MO_8$ (wherein, M=Fe, Co, Ni, Cu or Zn) or lithium manganese complex oxide of a spinel structure represented by $LiNi_xMn_{2-x}O_4$; lithium-nickel-manganese-cobalt oxide represented by $Li(Ni_pCo_qMn_{r1})O_2$ (wherein, $0<p<1$, $0<q<1$, $0<r1<1$, $p+q+r1=1$), or lithium-nickel-manganese-cobalt oxide represented by $Li(Ni_{p1}Co_{q1}Mn_{r2})O_4$ (wherein, $0<p1<2$, $0<q1<2$, $0<r2<2$, $p1+q1+r2=2$), or lithium-nickel-cobalt-transition metal(M) oxide represented by $Li(Ni_{p2}Co_{q2}Mn_{r3}M_{s2})O2$ (wherein, M is selected from the group consisting of Al, Fe, V, Cr, Ti, Ta, Mg and Mo, each of p2, q2, r3 and s2 is the atomic fraction of independent element, $0<p2<1$, $0<q2<1$, $0<r3<1$, $0<s2<1$, $p2+q2+r3+s2=1$), and the like may be mentioned, but the cathode active material is not limited thereto.

The cathode current collector is generally formed to a thickness of 5 µm to 300 µm. Such a cathode current collector is not specifically limited as long as it has high conductivity without inducing chemical change in corresponding battery, and for example, stainless steel, aluminum, nickel, titanium, baked carbon, or aluminum or stainless steel of which surface is treated with carbon, nickel, titanium, silver, and the like, may be used. On the surface of the cathode current collector, fine unevenness may be formed to increase adhesion with cathode active material, and it may be used in various shapes such as a film, a sheet, a foil, a net, a porous body, a foam body, a non-woven body, and the like.

Among the anode and cathode, in the electrodes where the above explained binder is not used, commonly known binders may be used. As representative examples, polyvinylalcohol, carboxylmethyl cellulose, hydroxypropyl cellulose, polyvinyl chloride, carboxylated polyvinyl chloride, polyvinyl fluoride, polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like may be used, but the binder is not limited thereto.

The anode and cathode may be respectively prepared by mixing each active material and binder, if necessary, a conductive agent, filler, and the like in a solvent to prepare electrode mixture slurry, and coating the electrode mixture on each electrode current collector. Since such an electrode preparation method is well known in the art, detailed explanation thereof will be omitted.

Battery

Meanwhile, according to another aspect of the invention, there is provided a rechargeable battery comprising the rechargeable battery electrode. The electrode may comprise a cathode; electrolyte; and an anode.

The rechargeable battery may be realized as a lithium rechargeable battery.

The lithium rechargeable battery may be prepared by impregnating an electrode assembly comprising a cathode, a separator and an anode with non-aqueous electrolyte.

The cathode and anode are as explained above.

The separator separates an anode and a cathode and provides pathway for lithium ion movement, and those commonly used in lithium batteries may be used. Namely, those having low resistance to electrolyte ion movement and having excellent electrolyte wetting capability may be used. For example, it may be selected from glass fiber, polyester, Teflon, polyethylene, polypropylene, polytetrafluoroethylene(PTFE) or combinations thereof, and it may be in the form of non-woven fabrics or woven fabrics. For example, polyolefin polymer separators such as polyethylene, polypropylene, and the like are mainly used for lithium ion batteries, and coated separators including ceramic components or polymer material may be used to secure heat resistance or mechanical strength, and it may be selectively used in a monolayer or multilayer structure.

According to circumstances, gel polymer electrolyte may be coated on the separator so as to increase battery stability. Representative examples of the gel polymer, polyethylene oxide, polyvinylidene fluoride, polyacrylonitrile, and the like may be mentioned.

However, in case solid electrolyte is used instead of the non-aqueous electrolyte, the solid electrolyte may also serve as a separator.

The non-aqueous electrolyte may be liquid electrolyte comprising a non-aqueous organic solvent and lithium salts. The non-aqueous organic solvent functions as a medium where ions involved in the electrochemical reactions of batteries can move.

As the non-aqueous electrolyte, non-aqueous liquid electrolyte, organic solid electrolyte, inorganic solid electrolyte, and the like may be used.

As the non-aqueous liquid electrolyte, aprotic organic solvents such as N-methyl-2-pyrrolidinone, propylene carbonate, ethylene carbonate, butylenes carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofurane, dimethylsulfoxide, 1,3-dioxolane, 4-methyl-1,3-dioxene, diethylether, formamide, dimethylformamide, dioxolane, acetonitrile, nitromethane, formic acid methyl, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofurane derivatives, ether, methyl propionate, ethyl propionate, and the like may be used.

As the organic solid electrolyte, polyethylene derivatives, polyethylene oxide derivatives, polypropylene oxide derivatives, phosphoric acid ester polymer, poly agitation lysine, polyester sulfide, polyvinyl alcohol, polyvinylidine fluoride, polymer containing ionic dissociable groups, and the like may be used.

As the inorganic solid electrolyte, nitride, halogenide, sulfate of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like may be used. The lithium salt is material soluble in the non-aqueous electrolyte, and for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroboroane lithium, lower aliphatic carbonic acid lithium, 4 phenyl lithium borate, and the like may be used.

And, in order to improve flame retardancy, and the like, to the electrolyte, pyridine, triethyl phosphate, triethanolamine, cyclic ether, ethylene diamine, n-glyme, hexaphosphoric acid triamide, nitrobenzene derivatives, sulfur, quinone imine dye, N-substituted oxazolidinone, N,N-substituted imidazolidine, ethyleneglycol dialkylether, ammonium salt, pyrrole, 2-methoxy ethanol, aluminum trichloride, and the like may be added. According to circumstances, in order to give incombustibility, halogen containing solvents such as carbon tetrachloride, trifluoroethylene, and the like may be further included, and in order to improve high temperature preservability, carbon dioxide gas may be further included, and FEC (fluoro-ethylene carbonate), PRS (propene sultone), FPC (fluoro-propylene carbonate), and the like may be further included.

The lithium rechargeable battery according to the invention may be not only used in a battery cell used as power supply of a small device, but also used as a unit battery in a medium-large sized battery module comprising plural battery cells.

Advantageous Effects

The binder composition for a rechargeable battery of the invention not only has excellent properties in terms of binding strength, mechanical properties, and the like, but also can maintain structural stability of the electrode even after repeated charge/discharge cycles, thus improving the performance of rechargeable batteries.

DETAILED DESCRIPTION OF THE EMBODIMENTS

Hereinafter, through specific examples of the invention, the actions and effects of the invention will be explained in more detail. However, these examples are presented only as the illustrations of the invention, and the scope of the right of the invention is not determined thereby.

Example

Preparation of Binder

The monomers of the following Table 1, and based on 100 parts by weight of the total monomer components, about 100 parts by weight of water as a solvent, and about 3 parts by weight of sodium lauryl sulfate as an emulsifier were introduced, the temperature was raised to about 80° C., and ammonium persulfate was introduced as a polymerization initiator at the mole ratio of 0.01 based on the monomer components, thus initiating emulsion polymerization. While maintaining the temperature at about 80° C., the reaction was progressed for about 4 hours to obtain binder in the form of emulsion having solid (latex particles) content of about 40 wt %, and the pH was adjusted to 7 using sodium hydroxide.

TABLE 1

|  | a1 | b1 | b4 | b3 | b5 | b2 | c1-1 | c1-2 |
|---|---|---|---|---|---|---|---|---|
| Example 1 | 1 | 1 |  |  |  | 1 | 0.001 |  |
| Example 2 | 1 | 1 |  |  |  |  | 0.001 |  |
| Example 3 | 1 |  | 1 |  |  |  | 0.002 |  |
| Example 4 | 1 |  | 0.5 |  |  | 1 | 0.01 |  |
| Example 5 | 1 | 0.3 | 0.1 |  | 0.1 |  | 0.01 |  |
| Example 6 | 1 | 1 | 0.1 | 0.1 | 0.1 | 0.1 | 0.002 |  |
| Example 7 | 1 | 1 |  |  |  |  | 0.02 |  |
| Example 8 | 1 | 1 |  |  |  |  |  | 0.001 |
| Comparative Example 1 | 1 | 1 |  |  |  |  |  |  |

TABLE 1-continued

|  | a1 | b1 | b4 | b3 | b5 | b2 | c1-1 | c1-2 |
|---|---|---|---|---|---|---|---|---|
| Comparative Example 2 |  | 1 |  |  |  |  |  | 0.002 |
| Reference Example 1 | 1 | 1 |  |  |  | 1 | 0.06 |  |
| Reference Example 2 | 1 | 1 |  |  |  | 1 | 0.0005 |  |

*a1: butadiene;
b1: styrene;
b4: acrylonitrile;
b3: acrylamide;
b5: acrylic acid;
b2: butylacrylate;

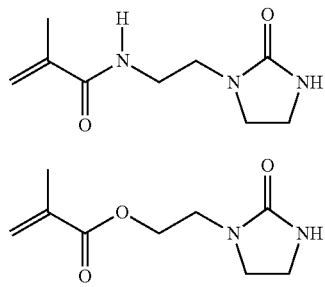

Preparation of an Anode Mixture

On the basis of 100 g of total solid content, 85.2 g of artificial graphite, 9.5 g of silicon oxide, 1 g of acetylene black, 7.5 g of the above prepared binder (solid content 40 wt %), and 1.3 g of carboxy methyl cellulose as a thickener were mixed using water as a dispersion medium, and anode slurry was prepared such that total solid content became 50 wt %.

Preparation of Anode

Using a comma coater, the above anode mixture was coated on a copper foil to a thickness of about 100 µm, dried in a dry oven of 80° C., and then, roll-pressed to the final thickness of 60 µm, thus obtaining an anode.

Evaluation of Dry Adhesive Strength

The above prepared anode plate was cut to a certain size and fixed to a slide glass, and while peeling the current collector, 180 degree peel strength was measured. It was repeated 5 times, and the mean value was summarized in the following Table 2.

Evaluation of Wet Adhesive Strength

The above prepared anode plate was cut to a certain size, and soaked in an electrolyte solution comprising ethylenecarbonate(EC):propylene carbonate(PC):diethylene carbonate(DEC)=3:2:5 (weight ratio) for 24 hours to make wet, and then, it was fixed on a slide glass, and while peeling the current collector, 180 degree peel strength was measured. It was repeated 5 times, and the mean value was summarized in the following Table 2.

Evaluation of Capacity Retention

A coin type lithium rechargeable battery was prepared using the above electrode and lithium. For the prepared coin type lithium rechargeable battery, a process of 0.1 C charge and 0.1 C discharge was repeated 30 times in the voltage range of 0.1 to 1 V, and the resulting capacity retention (30 cycle capacity retention) was summarized in the following Table 2.

TABLE 2

|  | Dry adhesive strength (unit: gf/cm) | Wet adhesive strength (unit: gf/cm) | Capacity retention (%) |
|---|---|---|---|
| Example 1 | 58 | 32 | 80 |
| Example 2 | 61 | 39 | 83 |
| Example 3 | 53 | 35 | 82 |
| Example 4 | 48 | 37 | 82 |
| Example 5 | 46 | 31 | 80 |
| Example 6 | 59 | 32 | 81 |
| Example 7 | 49 | 41 | 83 |
| Example 8 | 63 | 36 | 81 |
| Comparative Example 1 | 59 | 13 | 72 |
| Comparative Example 2 | 5 | 3 | 62 |
| Reference Example 1 | 18 | 14 | 70 |
| Reference Example 2 | 58 | 11 | 71 |

Referring to the Table 2, it is confirmed that the binder compositions according to Examples of the invention not only exhibit very excellent dry adhesive strength, but also exhibit excellent 30 cycle capacity retention.

Particularly, in the case of Comparative Example 1 prepared only with butadiene and acrylate monomers previously commonly used as electrode binder, although dry adhesive strength is excellent, wet adhesive strength is just about 30% of Examples.

Thus, it is expected that the electrode binder composition according to one example of the invention not only has excellent properties in terms of binding strength, mechanical properties, and the like, but also can maintain structural stability of the electrode even after repeated charge/discharge cycles, thereby significantly improving the performances of rechargeable battery.

What is claimed is:

1. An electrode binder composition for a rechargeable battery comprising emulsion polymer particles comprising
   a1) first repeat units derived from conjugated diene monomers; one or more second repeat units selected from the group consisting of b1) repeat units derived from aromatic vinyl monomers, b2) repeat units derived from alkyl (meth)acrylate monomers, b3) repeat units derived from (meth)acryl amide monomers, b4) repeat units derived from nitrile based monomers, and b5) repeat units derived from unsaturated carbonic acid monomers; and
   c1) third repeat units derived from monomers represented by the following Chemical Formula 1:

[Chemical Formula 1]

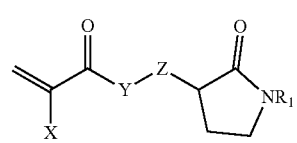

in the Chemical Formula 1,
R1 is hydrogen, or a C1-10 alkyl group,
X is hydrogen or a methyl group,
Y is —NR2—, R2 is hydrogen, or a C1-10 alkyl group, and
Z is a C1-10 alkyl group,
wherein the third repeat units are included at a ratio of 0.0001 to 0.03, based on the total repeat number of the first repeat units, the second repeat units, and the third repeat units.

2. The electrode binder composition according to claim 1, wherein in the Chemical Formula 1,
X is a methyl group,
Y is —NH—, and
Z is a C1-3 alkyl group.

3. The electrode binder composition according to claim 1, wherein the second repeat units are included at a ratio of 0.1 to 5, based on the repeat number of the first repeat units.

4. The electrode binder composition according to claim 1, wherein the third repeat units are included at a ratio of 0.0006 to 0.03, based on the repeat number of the first repeat units.

5. The electrode binder composition according to claim 1, wherein the emulsion polymer particles further comprise one or more emulsifiers selected from the group consisting of anionic emulsifiers, cationic emulsifiers, and non-ionic emulsifiers.

6. The electrode binder composition according to claim 5, wherein the anionic emulsifier comprises one or more selected from the group consisting of sodium dodecyl diphenyl ether disulfonate, sodium polyoxyethylene alkyl ether sulfate, sodium lauryl sulfate, sodium dodecyl benzene sulfonate, and dioctyl sodium sulfosuccinate.

7. The electrode binder composition according to claim 5, wherein the non-ionic emulsifier comprises one or more selected from the group consisting of polyethylene oxide alkyl aryl ether, polyethylene oxide alkyl amine, and polyethylene oxide alkyl ester.

8. The electrode binder composition according to claim 5, wherein the one or more emulsifiers are included in an amount of 0.01 to 10 parts by weight, based on 100 parts by weight of monomer components.

9. The electrode binder composition according to claim 1, further comprising an aqueous solvent.

10. The electrode binder composition according to claim 9, wherein the aqueous solvent is included in an amount of 50 to 1,000 parts by weight, based on 100 parts by weight of the latex particles.

11. A rechargeable battery electrode mixture comprising the electrode binder composition according to claim 1 and electrode active material.

12. The rechargeable battery electrode mixture according to claim 11, further comprising a conductive agent.

13. A rechargeable battery electrode comprising
an electrode mixture layer comprising the rechargeable battery electrode mixture of claim 11; and
an electrode current collector.

14. A rechargeable battery comprising the rechargeable battery electrode of claim 13.

* * * * *